April 16, 1957 R. DE VIENNE ET AL 2,788,992
SEALING ATTACHMENT FOR ELECTRIC CABLES OR THE LIKE
Filed March 9, 1953
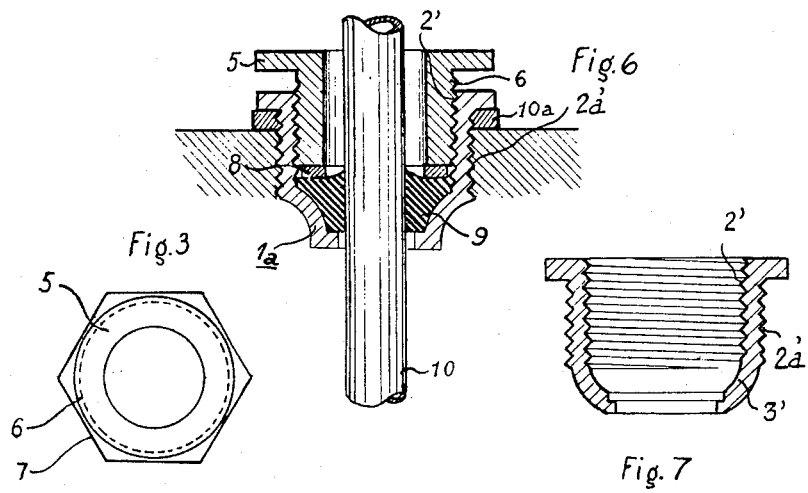
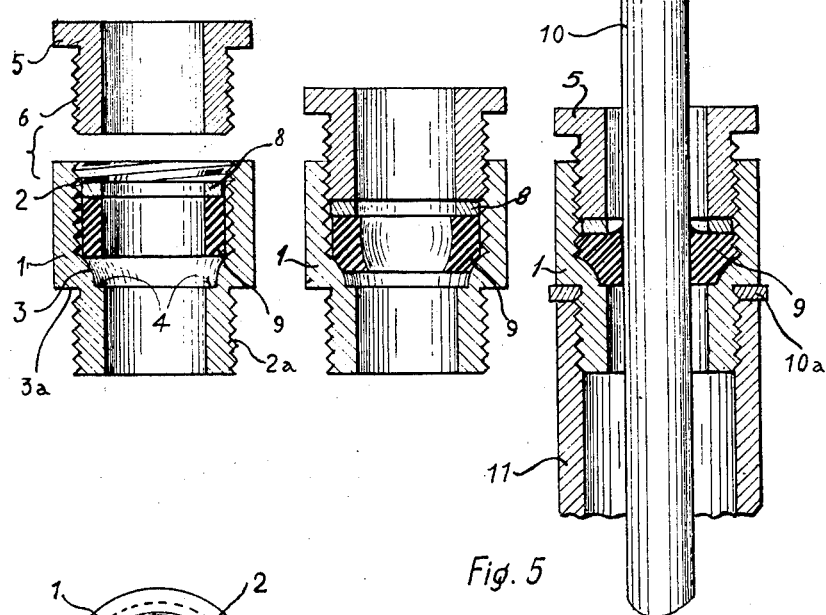
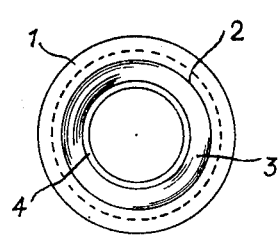
Inventors
R. De Vienne
J. De Vienne
By Glenn Downing Deible
Attys.

United States Patent Office 2,788,992
Patented Apr. 16, 1957

1

2,788,992

SEALING ATTACHMENT FOR ELECTRIC CABLES OR THE LIKE

Robert De Vienne, Colombes, and Jean De Vienne, La Garenne, France

Application March 9, 1953, Serial No. 341,044

5 Claims. (Cl. 285—158)

This invention relates to a device for securing an elongated element such as an electric cable, a braided wire or a rigid or flexible pipe in an aperture provided for this purpose.

As an example, the device to which the invention relates may be used for securing an electrical cable in an opening provided, for this purpose, in a partition.

An object of the invention is to provide a securing device of this type which is very compact and ensures sufficient gripping of the cable for a wide range of diameters, said gripping being moreover obtained quickly and without requiring considerable screwing forces.

According to the invention there is provided a device for securing to a member having an aperture, an elongated element inserted therein, comprising a socket member adapted to be secured in said aperture and having an annular curved inner surface terminating in an inturned radial shoulder, a ring member made of elastic material being slidably mounted in said socket member, and a ferrule being adapted to be screwed into said socket member so as upon inward screwing movement therein to first apply pressure to said ring member for forcing a portion thereof into sliding engagement over said inner curved surface to cause said ring member to gradually contract upon the elongated element, and then to compress said ring member between said shoulder and said ferrule for progressively deforming the ring member in a radial direction in order to force the inner cylindrical surface thereof against said elongated element.

In one embodiment of the invention, the above mentioned annular curved inner surface is convex, the cross section of which in a plane containing the axis of that tubular member which is provided with the constricted wall portion constituted by said curved inner surface offers, with respect to said axis, a varying slope which is slightly less than 90° at the end into which the ring of elastic material is introduced and then decreases progressively to reach a very small value at its other end.

With this arrangement the "approach" contraction is quicker and the final clamping easier.

Another object of the invention is to provide a securing device of the type described the body of which is adapted to be manufactured by stamping and, thence, at a very low cost.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is an axial cross-sectional view of a securing device according to the invention comprising a threaded ferrule which is shown removed.

Fig. 2 is a top view of the tubular body of Fig. 1.

Fig. 3 is a top view of the threaded ferrule of Fig. 1.

Fig. 4 is an axial cross-sectional view of the device of Fig. 1, the threaded ferrule of said device being shown partly screwed in the tubular body.

Fig. 5 shows the same device together with a cable, the threaded ferrule being shown almost completely screwed into the tubular body and the whole assembly being shown secured on a tubular part.

Fig. 6 shows a particularly advantageous embodiment of the threadings of the attachment together with a modified embodiment of the progressive constriction and Fig. 7 is an axial cross-sectional view of another embodiment similar to Fig. 5 and showing an attachment having external threads such as shown in Fig. 6, screwed in a threaded opening and securing a pipe therein.

Referring first to Figs. 1 to 5, there is shown at 1 a tubular body provided, at one end, with a threaded bore 2 and, at its other end, with a screw thread 2a adapted to secure the attachment on a part such as 11 to thereby clamp a cylindrical element such as cable 10 shown in Fig. 5. An outer shoulder 3a is provided, in this embodiment, between thread 2a and the tubular body 1, said shoulder 3a being adapted to bear on the external edge of part 11, if required, through an ancillary packing washer 10a.

Bore 2 merges into a progressively decreasing constriction constituted by a convex annular surface 3, which terminates in a flat annular shoulder 4 arranged at a right angle with respect to the axis of the attachment.

The above-mentioned convex annular surface is constituted by a segment of a tore generated by an arc of a circle which is but slightly smaller than 90°, so that the end of the surface 3 opposed to shoulder 4 is substantially at a right angle with respect to the axis of the tubular body 1. 5 is a ferrule provided with a bore adapted to accommodate a cable, or the like and with an outer thread 6 adapted to be screwed in the inner thread 2 of the tubular body 1. To obtain an easy and safe clamping of the cable, it is convenient to provide the outer portion of ferrule 5, as shown in Fig. 3, with a hexagonal head 7 which permits using, for the tight screwing of the ferrule 5, a usual hexagonal wrench. A cylindrical ring 9 which is made of a plastic and/or elastic material such as rubber is inserted into the threaded bore of the tubular member 1 after the cable 10 or, more generally, the element to be secured, has been passed through said ring. A washer 8 is preferably set on ring 9 before screwing ferrule 5, so as to suppress any direct friction between said ferrule and the ring.

The socket member 1a shown in Fig. 6 differs from the socket member 1 shown in Figs. 1 to 5 in that its inner and outer screw threads are formed on the same portion of the socket member instead of on opposite end portions as shown in Figs. 1 to 5, thus reducing the overall length of the device.

These embodiments operate as follows:

When the threaded ferrule 5 is screwed in the inner thread 2, as shown in Fig. 4, ring 9 is first brought into contact with the annular convex surface 3, whereby a tightness is immediately established between the outer periphery of ring 9 and the said annular surface. If ferrule 5 is further screwed down, the inner wall of ring 9 is progressively constricted in the manner of a diaphragm until it embraces the periphery of the cable 10. From this moment, a further screwing causes a further constriction of the ring, which determines rapidly a good tightness and an excellent clamping of cable 10.

When ring 9, as shown in Figs. 5 or 6, reaches the flat annular shoulder 4, the clamping is thus already sufficient if cable 10 has a sufficiently large diameter. However, it is still possible, if the clamping is not sufficient, for example, due to cable 10 having a diameter but slightly larger than the minimum value of the range for which the device is provided, to further screw ferrule 5, which causes a radial deformation of ring 9 resulting from the axial compression to which it is then subjected.

The socket shown in Fig. 7 is similar to that of Fig. 6 but the inner curved annular surface 3 is concave, said surface being a segment of a tore generated by the arc of a circle which is slightly less than 90°.

It will be easily understood that, with a securing device according to the invention, it is possible to tightly secure with a given ring a wide range of elements having different external diameters of various shapes (braided wires, polygonal elements, pipes having irregular walls and so on).

It will also be apparent that with such a device a fluid-tight seal can be established between the element and the tubular body, the effectiveness of the seal being mainly determined by the radial pressure exerted by the cylindrical ring.

In Fig. 7, it may be seen that the socket member is of substantially uniform thickness, which permits manufacturing said member in a very economical manner by a simple stamping operation ensuring in the same time the formation of the progressive constriction and that of the two threads.

While the invention has been described with particular reference to a preferred embodiment, it is not intended to limit the scope of the invention to the embodiment illustrated, nor otherwise than by the terms of the subjoined claims.

What is claimed is:

1. A device for tightly attaching an elongated element to a member having an aperture therein, said device comprising a socket member adapted to be secured in said aperture and having an internally threaded cylindrical wall portion continued by an unthreaded constricted wall portion formed with an annular curved inner surface and terminating in an inturned radial shoulder apertured to accommodate the passage of an elongated element through said socket member, a ring member of elastic material having an outer diameter less than the inner diameter of the cylindrical wall portion whereby said ring member is slidably mounted in said cylindrical wall portion and having, in unstressed condition, an axial length greater than that of said constricted wall portion and an internal diameter greater than the maximum diameter of the elongated element to be subsequently inserted through the ring member, and a ferrule adapted to be threaded into said cylindrical wall portion so as upon inward screwing movement therein to first apply pressure to the ring member for forcing a portion thereof into sliding engagement over said inner curved surface to cause said ring member to gradually contract upon the elongated element, and then to compress said ring member between said shoulder and said ferrule for progressively deforming the ring member in a radial direction in order to tightly press the inner cylindrical surface area thereof against the elongated element whereby the ring member defines the sole means securing the elongated element within the socket member.

2. A device for tightly attaching an elongated element to a member having an aperture therein, said device comprising a socket member adapted to be secured in said aperture and having an internally threaded cylindrical wall portion continued by an unthreaded constricted wall portion having an annular inner surface curved inwardly toward the axis of the socket member and terminating inwardly of the end thereof, a radial shoulder extending inwardly from the terminal end of said curved surface in a direction transverse to the axis of the socket and terminating in an inner end, said shoulder constituting an abutment surface extending radially inwards of said curved surface and at least the inner terminal end of the radial shoulder lying at least at the level of the terminal end of the curved surface as regards the direction of insertion of an elongated element, said shoulder defining an aperture to accommodate the passage of the elongated element through said socket member, a ring member of elastic material having an outer diameter less than the inner diameter of the cylindrical wall portion whereby said ring member is slidably mounted in said cylindrical wall portion and having, in unstressed condition, an axial length greater than that of said constricted wall portion and an internal diameter greater than the maximum diameter of an elongated element to be subsequently inserted through the ring member, and a ferrule adapted to be threaded into said cylindrical wall portion so as upon inward screwing movement therein to first apply pressure to the ring member for forcing a portion thereof into sliding engagement over said inner curved surface to cause said ring member to gradually contract upon the elongated element, and then to compress said ring member between said shoulder and said ferrule for progressively deforming the ring member in a radial direction in order to tightly press the inner cylindrical surface area thereof against the elongated element whereby the ring member defines the sole means securing the elongated element within the socket member.

3. A device according to claim 1, in which said inner annular curved surface of the constricted wall portion is convex.

4. A device according to claim 1, in which said inner annular curved surface of the constricted wall portion is concave.

5. A device according to claim 1, in which a metal washer is interposed between said ring member and said ferrule to avoid direct friction therebetween.

References Cited in the file of this patent

UNITED STATES PATENTS

| 868,113 | Oakman | Oct. 15, 1907 |
| 1,160,944 | Muller | Nov. 16, 1915 |
| 1,581,538 | Hill | Apr. 20, 1926 |
| 2,211,776 | Haury | Aug. 20, 1940 |
| 2,364,447 | Hynes | Dec. 5, 1944 |

FOREIGN PATENTS

| 225,843 | Switzerland | May 17, 1943 |